(12) United States Patent
Pronkine

(10) Patent No.: US 8,248,590 B2
(45) Date of Patent: Aug. 21, 2012

(54) METHOD AND APPARATUS FOR AUXILIARY ILLUMINATION FOR DETECTING AN OBJECT

(75) Inventor: Viatcheslav Pronkine, Edgewater, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 131 days.

(21) Appl. No.: 12/865,468

(22) PCT Filed: Jan. 27, 2009

(86) PCT No.: PCT/US2009/032104
§ 371 (c)(1),
(2), (4) Date: Jul. 30, 2010

(87) PCT Pub. No.: WO2009/097263
PCT Pub. Date: Aug. 6, 2009

(65) Prior Publication Data
US 2011/0013180 A1 Jan. 20, 2011

Related U.S. Application Data

(60) Provisional application No. 61/023,974, filed on Jan. 28, 2008.

(51) Int. Cl.
*G01J 1/10* (2006.01)
*G01N 21/88* (2006.01)
*G01N 9/04* (2006.01)
(52) U.S. Cl. .................. 356/229; 356/239.1; 250/223 B
(58) Field of Classification Search .................. 356/229, 356/239.3, 239.4, 239.5, 239.6, 239.7, 239.8; 250/223 B, 227, 224, 560; 209/529, 522, 209/523, 524, 525; 382/141, 199, 128; 600/432
See application file for complete search history.

(56) References Cited

U.S. PATENT DOCUMENTS

| | | | | |
|---|---|---|---|---|
| 4,625,107 A | * | 11/1986 | Planke | 250/223 B |
| 5,753,905 A | | 5/1998 | Ringlien | |
| 5,898,169 A | * | 4/1999 | Nordbryhn | 250/223 B |
| 6,118,886 A | | 9/2000 | Baumgart et al. | |
| 6,877,659 B2 | | 4/2005 | Abramsohn | |
| 7,227,996 B2 | | 6/2007 | Imagawa et al. | |
| 2002/0042153 A1 | | 4/2002 | Holcman et al. | |
| 2004/0239952 A1 | * | 12/2004 | Mueller | 356/614 |
| 2006/0178578 A1 | | 8/2006 | Tribble et al. | |
| 2007/0297665 A1 | | 12/2007 | Segev | |

OTHER PUBLICATIONS

ISA/US, International Search Report, Mar. 24, 2009.

* cited by examiner

*Primary Examiner* — Sang Nguyen
(74) *Attorney, Agent, or Firm* — Weingarten, Schurgin, Gagnebin & Lebovici LLP

(57) ABSTRACT

A detection system and method for detecting an object such as a vessel or a cap on a vessel. The system includes an imaging device having a lens with a field of view for registering and processing an image of the object, an illumination device(s) for actively illuminating the object, a dark background portion, and an auxiliary light reflective area(s) for passively illuminating an edge portion of the object using reflections of illumination from the illumination device(s). The auxiliary light reflective area(s) is/are disposed adjacent to the dark background portion out of the field of view of the lens. Images of the object are subsequently compared to images of reference objects.

17 Claims, 5 Drawing Sheets

METHOD AND APPARATUS FOR AUXILIARY ILLUMINATION FOR DETECTING AN OBJECT

CROSS REFERENCE TO RELATED APPLICATIONS

This application claims the benefit of U.S. Provisional Application No. 61/023,974 filed on Jan. 28, 2008 under 35 U.S.C. §119(e), the disclosure of which is incorporated by reference herein.

STATEMENT REGARDING FEDERALLY SPONSORED RESEARCH OR DEVELOPMENT (Not applicable)

BACKGROUND OF THE INVENTION

1. Field of the Invention

Devices, systems, and methods for detecting the presence or absence of an object, e.g., a cap on a sample vessel or the sample vessel itself, are disclosed and, more specifically, devices, systems, and methods that include passive, auxiliary reflective areas that are adapted to illuminate an edge portion of the object passively for better contrast against a dark background.

2. Description of the Related Art

Reliable, rapid detection of the presence or absence of an object, such as a cap on a sample vessel or the sample vessel itself, is desirable in laboratory automation and other applications. One method of detecting objects is through image acquisition by which an image of a target is collected and compared to a reference image.

For image acquisition to be reliable, the images must have acceptable definition, which is to say that there must be sufficient contrast between the object being imaged and the background, to determine whether or not the object is present, i.e., that the cap is on or is not on the sample vessel.

Illumination of the object can be active or passive or a combination of the two. Intuitively, use of a light, e.g., white, background for passive illumination in combination with dark objects should be preferred. However, in practice, light backgrounds are subject to shading. Accordingly, darker backgrounds, which generally have relatively lower reflectivity than light backgrounds, are preferred.

However, achieving an acceptable definition, for example, using a dark background and relatively dark objects is more difficult because there may be an indistinguishable contrast between the object and the dark background. Even using a high quality, optically black background for contrast may not provide reliable results.

Referring to FIG. 1, a common object detection system in accordance with the prior art is shown. The system 10 includes a dark, e.g., black, background 12 and an imaging device, e.g., a camera 14. The camera 14 includes a lens 16 and a pair of illumination devices or light sources 11 and 13 that are adapted to generate active illumination. Optionally, the illumination devices 11 and 13 do not have to be part of the camera 14 (as shown), but can, instead, be separate elements that are disposable at, near or remote from the camera 14.

Illumination device 11 is adapted to generate a beam of light 17 and illumination device 13 is adapted to generate a beam of light 18, which collectively actively illuminate the object 15 and the dark background 12. Light reflected from the dark background (if any) and the object 15 that is within the field of view 19 of the lens 16 are collected by the imaging device 14, which is adapted to produce an image of the object 15.

As is well-known, incident light that is reflected includes diffuse reflections and specular reflections. Specular reflection is near "perfect" reflection. Light from a single direction is reflected in a single direction, such that the angle of incidence ($\theta_i$) is equal to the angle of reflection ($\theta_r$). In contrast, diffuse reflections result in incident light being reflected or scattered in multiple directions.

Diffuse reflection body angle distribution depends, in large part, on the quality of the surface, but can generally be approximated using the following equation:

$$R \bullet ((1-C)\cos(\theta_i - \theta_d) + C)$$

in which R corresponds to the brightness of the material, e.g., R=1−A, where A is a light absorption coefficient; $\theta_d$ corresponds to the angle at which light is registered, e.g., by a lens; and C is a scatter coefficient indicative of how much non-absorbed light is reflected in directions other than those directions corresponding to specular reflection. For most materials, however, even materials that are dark and/or matte, more light is reflected in the direction of $\theta_r$, as shown in FIG. 2, especially when the angles of incidence and reflection decrease with respect to the object plane normal.

Problematically, as shown with FIG. 1, light 17 and 18 incident on an insufficiently dark background 12 that is reflected and registered by the lens 16 of the camera 14 often causes the background 12 to appear brighter relative to the object 15. Moreover, referring to FIG. 3, at contrast points, i.e., edge portions 46 and 48, specular reflections 49 of light 47 incident on an object 15 and specular reflections 44 of light 43 incident on the dark background 12 that pass near the edges 46 and 48 of the object 15, but without being incident thereon, will cause the image of the object 15 to appear to be much darker relative to the dark background 12, making recognition of an object or object feature (e.g., a vessel or a vessel cap) more difficult.

BRIEF SUMMARY OF THE INVENTION

In accordance with the present invention, devices, systems, and methods for detecting an object, e.g., a cap on a vessel or the vessel itself, are disclosed. The system includes an imaging device having a lens with a field of view for registering and processing an image of the object, an illumination device (s) for actively illuminating the object, a dark background portion, and an auxiliary light reflective area(s) for passively illuminating an edge portion of the object. The auxiliary light reflective area(s) is/are disposed adjacent to the dark background portion and beyond the field of view of the lens. Images of the object are subsequently compared to images of reference objects.

The method for detecting an object includes arranging a dark background behind an object target location; arranging an auxiliary light reflective area(s) adjacent to the dark background; illuminating the auxiliary light reflective area(s) so that light reflected from the auxiliary light reflective area(s) passively illuminates an edge portion of the object if the object is in the object target location; and acquiring an image of the illuminated edge portion of the object if the object is in the object target location, the illuminated edge portion being differentiatable from the dark background. The method further includes the step of analyzing the acquired image to detect the presence of the object.

BRIEF DESCRIPTION OF THE SEVERAL VIEWS OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

This application claims the benefit of U.S. Provisional Application No. 61/023,974, the disclosure of which is incorporated by reference in its entirety.

A system and method for detecting an object is disclosed. Also disclosed is a method of improving the definition of an image. Although the invention will be described in connection with a cap detection system for detecting the presence or absence of a cap on a sample vessel, the invention is not to be construed as being limited thereto. Indeed, those of ordinary skill in the art will appreciate the universal application of the disclosed imaging system and method to any use for which the presence or absence of an object is determined automatically and rapidly.

Figure 1:
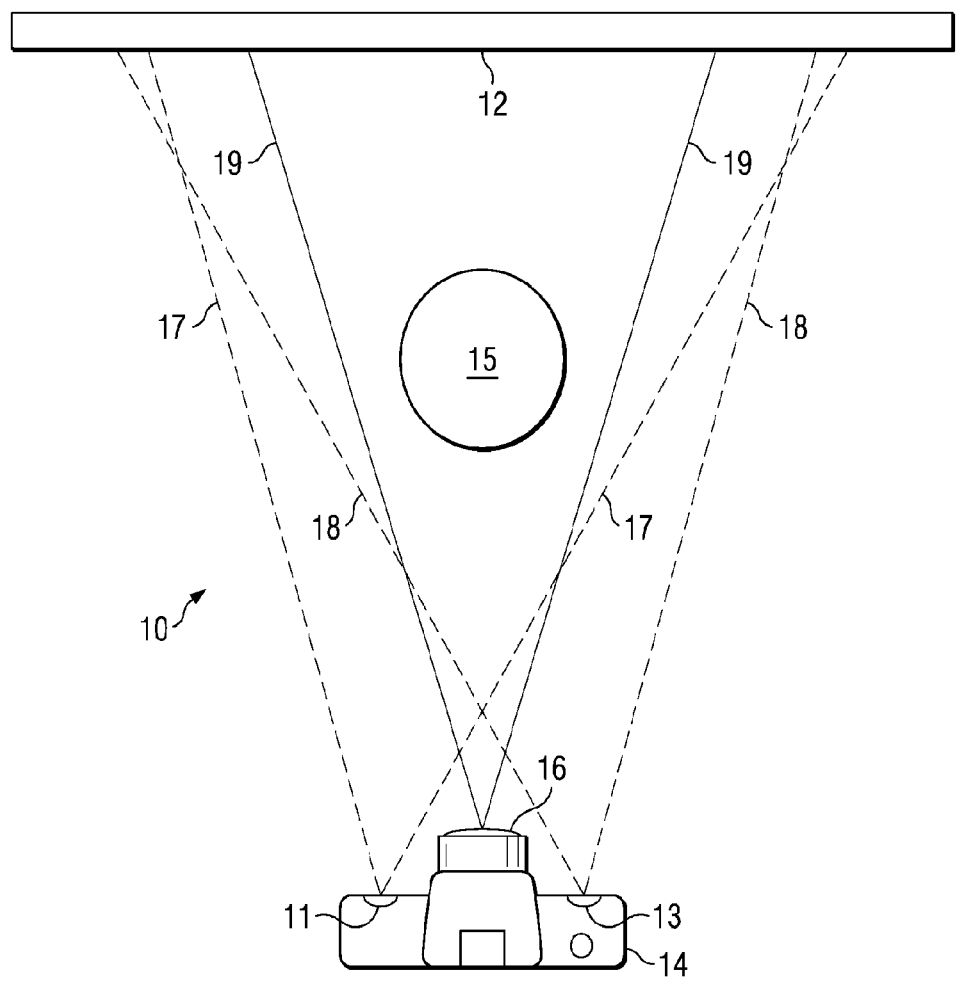
FIG. 1 shows a cap detection system in accordance with the prior art.
Figure 2:
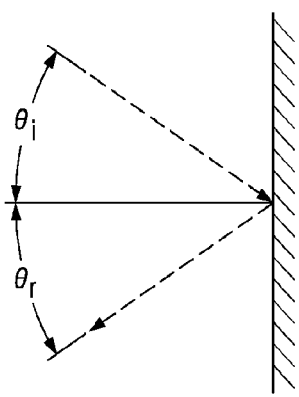
FIG. 2 illustrates specular reflection.
Figure 3:
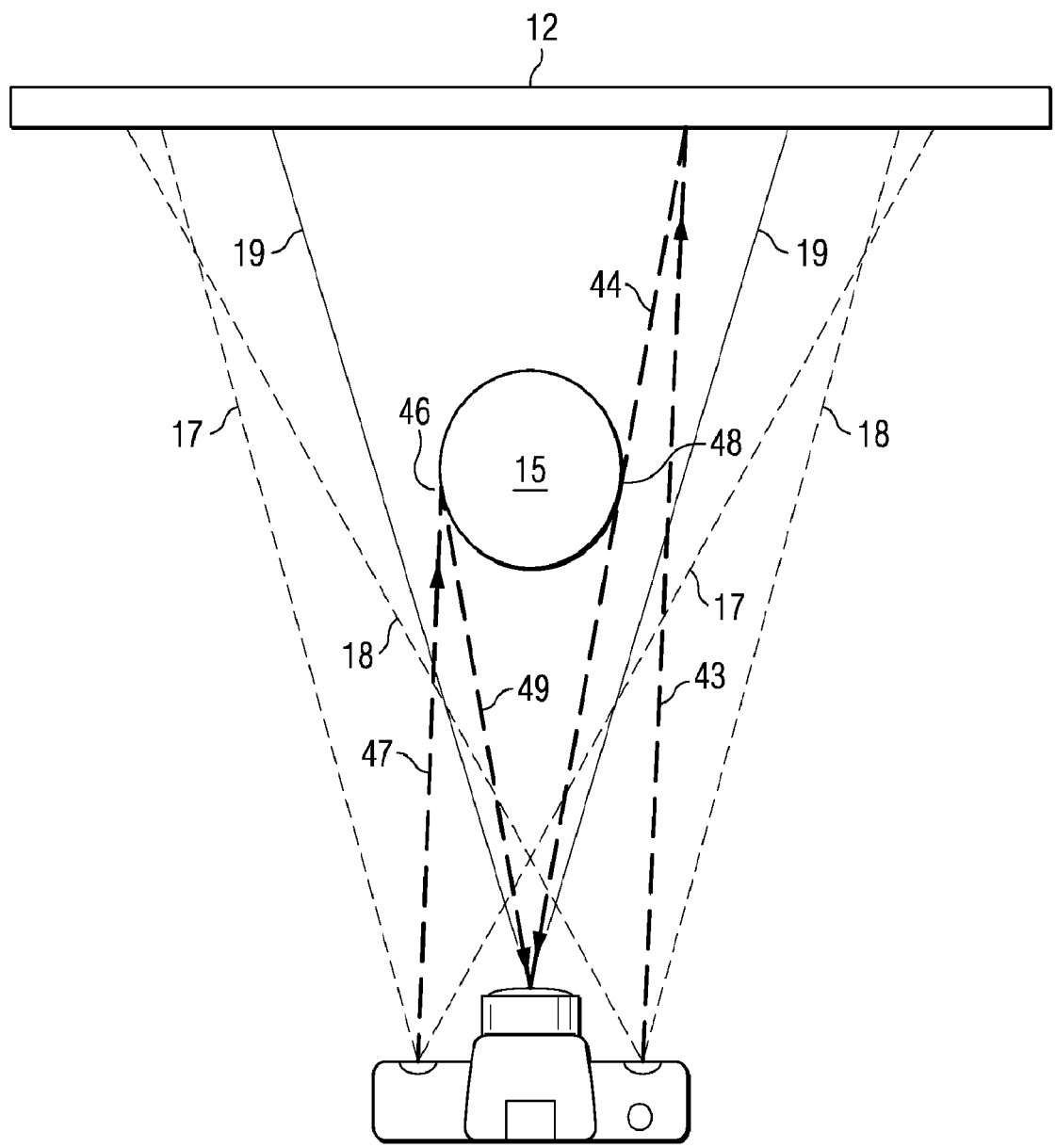
FIG. 3 shows a cap detection system with a dark background in accordance with the prior art.
Figure 4:
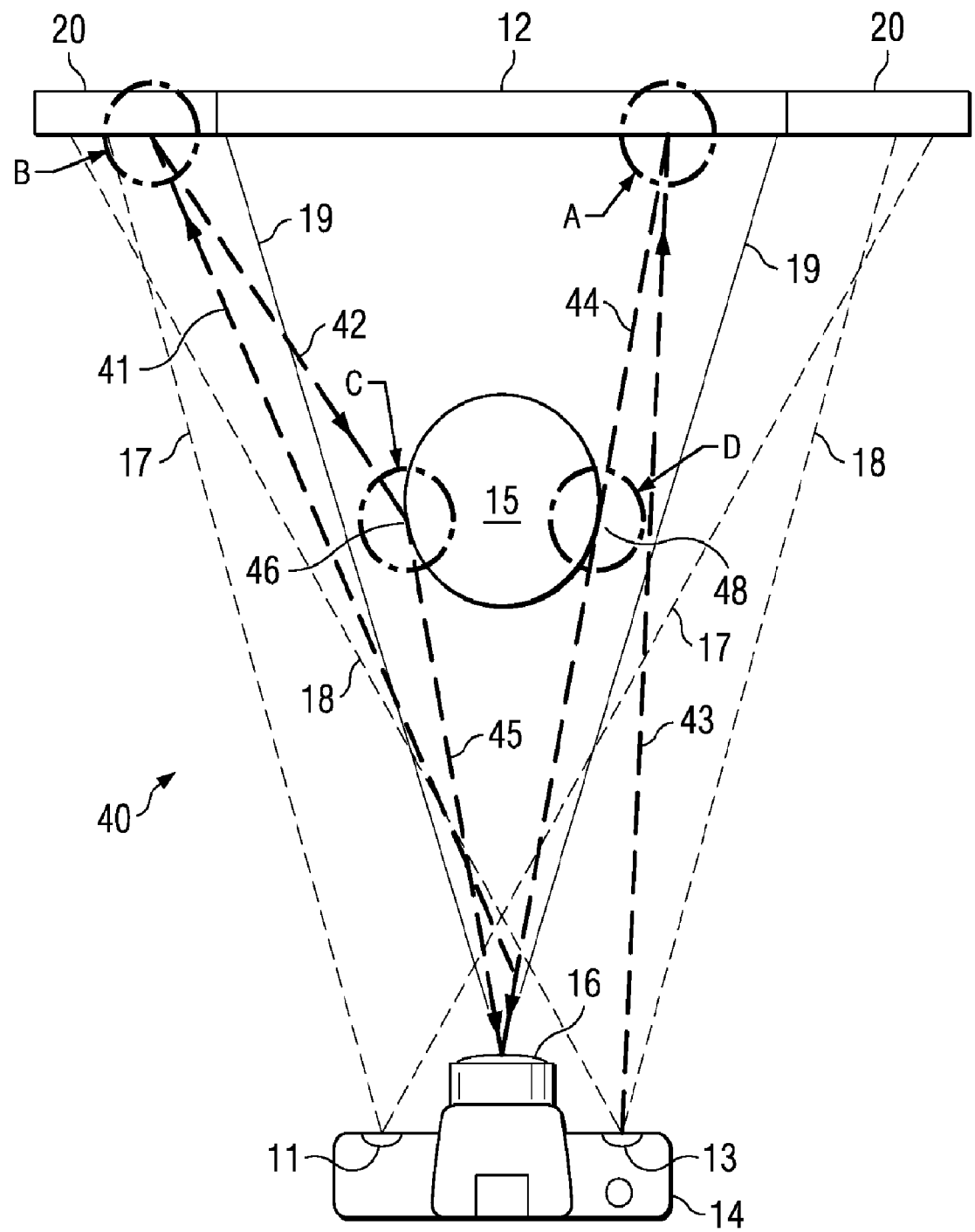
FIG. 4 shows a cap detection system having auxiliary light reflective regions in accordance with the presently disclosed invention.

Referring to FIG. 4, the system 40 includes an imaging device, e.g., a camera 14, and a background that includes white, reflective auxiliary light reflective areas 20 that are disposed at opposing ends of the dark portion 12 of the background. The extent of the white, reflective auxiliary light reflective areas 20 is structured and arranged so that the areas 20 are not within, i.e., are disposed beyond, the field of view 19 of the camera 14.

At edge portions 46 and 48 of the object 15, the image will include, as before, the specular reflections 49 of light 47 incident on an object 15 (not shown) and the specular reflections 44 of light 43 incident on the dark background 12 (e.g., at point A) that pass near the edge portions 46 and 48 of the object 15 (e.g., point D), but without being incident thereon, in combination with specular reflections 45 from the edge portions 46 and 48 (e.g., point C) due to light 42 reflected from the white, reflective auxiliary light reflective areas 20.

More particularly, the white, reflective auxiliary light reflective areas 20 are structured and arranged to reflect incident light 41 (e.g., from point B) to the edge portions 46 and 48 of the object 15 (e.g., point C). The reflected light 42 from the white, reflective auxiliary light reflective areas 20 incident on the object 15 (e.g., at point C) at edge portions 46 and 48 generates specular reflections 45, which are further directed towards the point of registration of the lens 16. Illumination from the white, reflective auxiliary light reflective areas 20 produces better definition and sharper contrast between the dark background portion 12 and the illuminated edge portions 46 and 48 of the object 15.

Imaging methods and means are well-known to the art and are beyond the scope of this invention. Once an image has been generated and processed, either via digital or analog techniques, statistical analysis is used to determine whether or not the object 15 is present. Although the invention is described in contemplation of a use with vessels, to determine whether or not the vessels are, indeed, capped, the invention is not to be construed as being limited thereto. The application of the system and method of the present invention for other purposes and in other scenarios is clearly envisioned.

Figure 5:
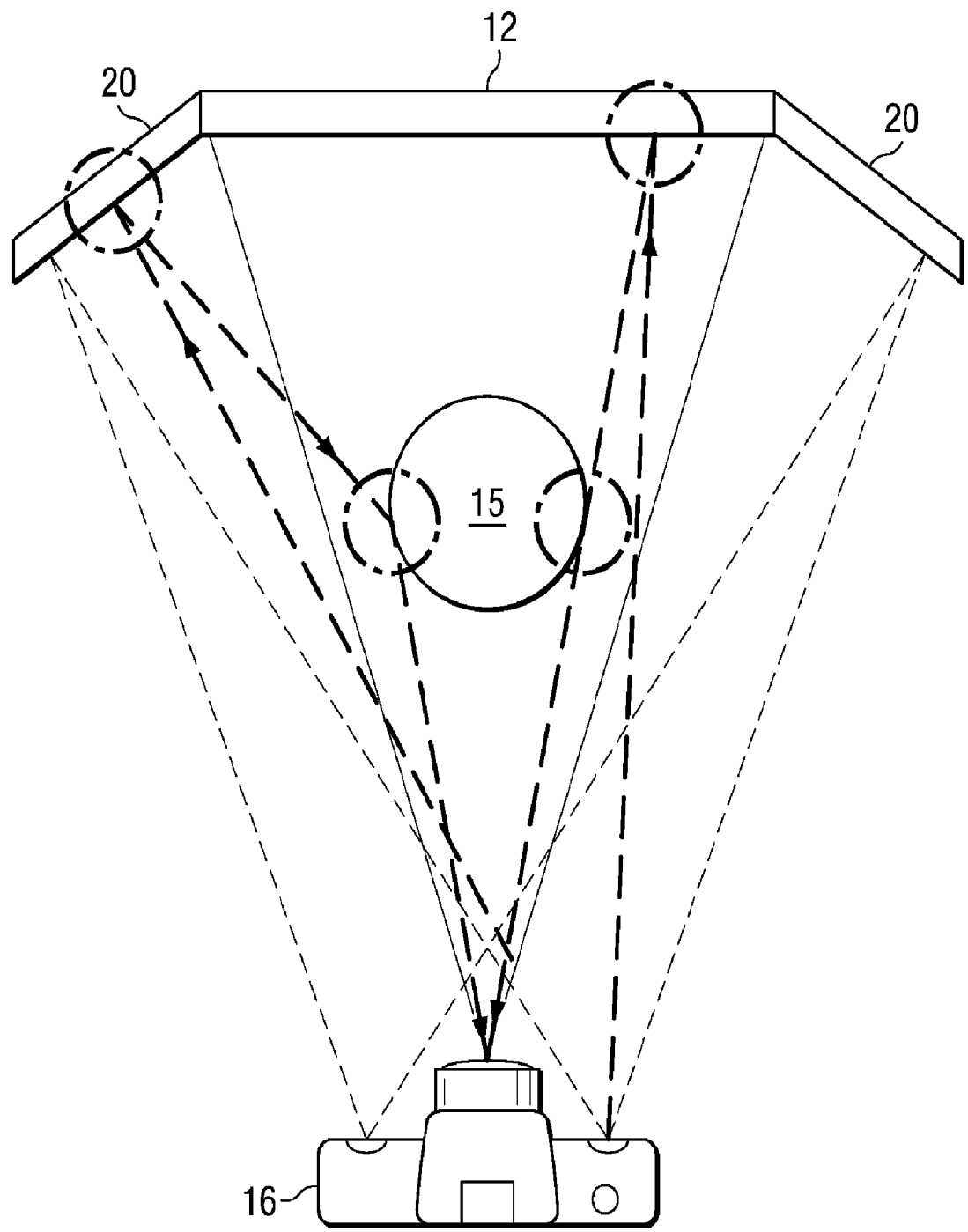
FIG. 5 shows a cap detection system having auxiliary light reflective regions that are angled towards the imaging device and object in accordance with the presently disclosed invention.
Figure 6:
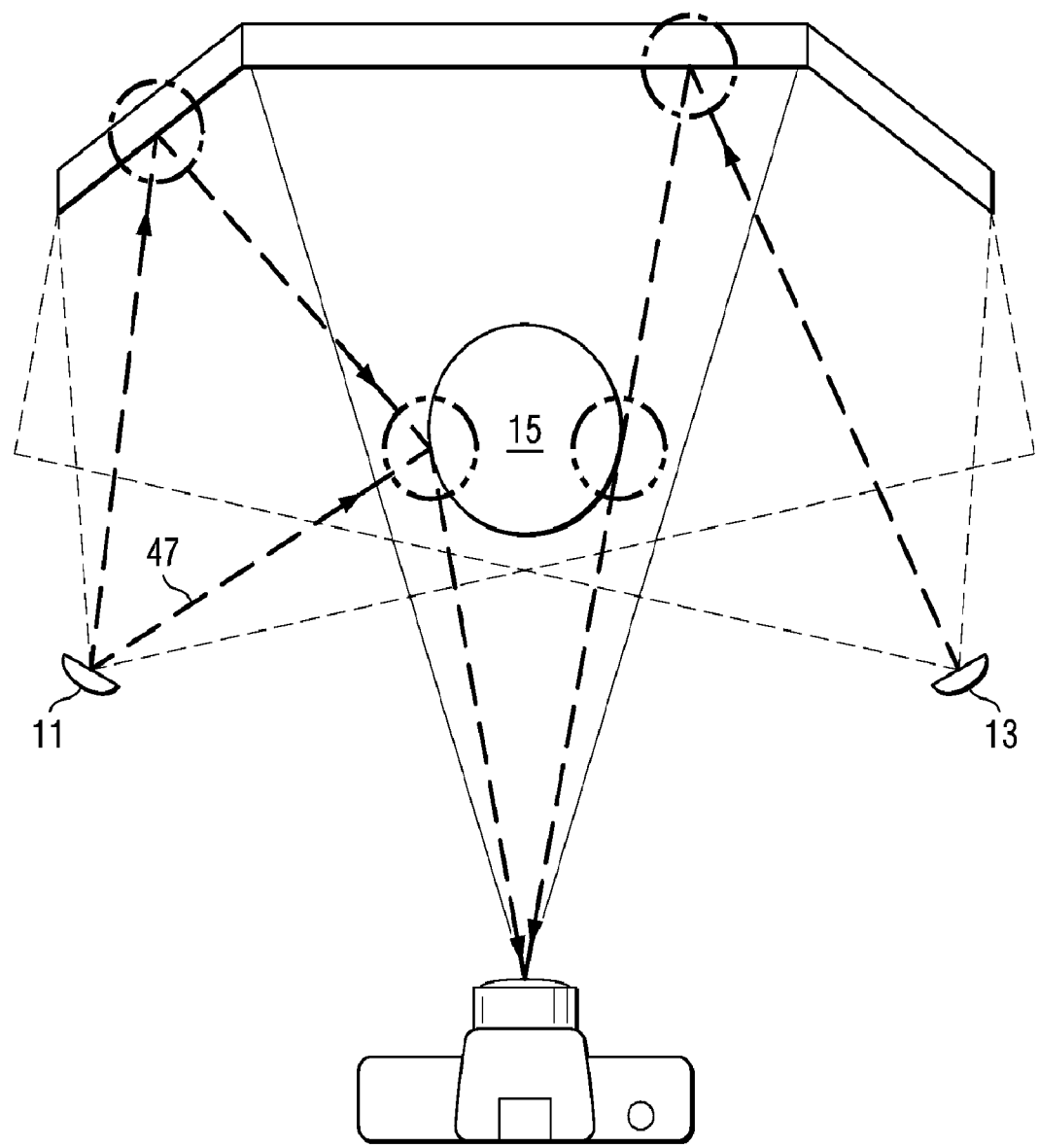
FIG. 6 shows a cap detection system having auxiliary light reflective regions that are angled towards the imaging device and object and remote illumination devices in accordance with the presently disclosed invention.

Referring to FIG. 5, optionally the white, reflective auxiliary light reflective areas 20 can be angled towards the object 15 and the imaging device 16 to direct greater passive illumination towards the edge portions 46 and 48 of the object 15. Similarly, and referring to FIG. 6, the illumination devices 11 and 13 can be disposed remote from the camera 14, to focus greater active illumination 47 directly onto the edge portions 46 and 48 of the object 15 as well as onto the reflective auxiliary light reflective areas 20.

Although the invention has been described using white, reflective auxiliary light reflective areas 20 on both ends of a dark background 12, a single white, reflective auxiliary light reflective area 20 on either opposing end would also provide an image with suitable definition and greater contrast against the dark background 12.

Many changes in the details, materials, and arrangement of parts and steps, herein described and illustrated, can be made by those skilled in the art in light of teachings contained hereinabove. Accordingly, it will be understood that the following claims are not to be limited to the embodiments disclosed herein and can include practices other than those specifically described, and are to be interpreted as broadly as allowed under the law.

What I claim is:

1. A detection system for detecting at least one edge portion of an object in front of a dark background, the system comprising:
    an imaging device for generating at least one image of the object, the imaging device having a lens and a field of view;
    at least one auxiliary light reflective area that is structured and arranged for passively illuminating the at least one edge portion of the object, the at least one auxiliary light reflective area being remotely disposed from the lens and beyond the field of view of the imaging device; and
    at least one illumination device for actively illuminating the object and the at least one auxiliary light reflective area, whereby light reflected from the at least one auxiliary light reflective area results in the passive illumination of the at least one edge portion of the object.

2. The detection system as recited in claim 1, wherein the at least one auxiliary light reflective area is disposed adjacent to the dark background portion.

3. The detection system as recited in claim 1, wherein the at least one auxiliary light reflective area includes auxiliary light reflective areas which are, respectively, disposed at opposing ends of the dark background portion.

4. The detection system as recited in claim 1, wherein the at least one auxiliary light reflective area is angled towards the object and the imaging device.

5. The detection system as recited in claim 1, wherein the at least one illumination device is disposed adjacent to and coaxial with an optical axis of the imaging device.

6. The detection system as recited in claim 1, wherein the detection system further comprises an image processor for processing an image of the object having at least an edge portion thereof passively illuminated by the at least one auxiliary light reflective area.

7. The detection system as recited in claim 1, wherein the object is a vessel.

8. The detection system as recited in claim 7, wherein the object further comprises a vessel cap disposed in conjunction with the vessel.

9. A method for improving the detectability of an object at an object target location using an imaging device having a lens and a field of view, the method comprising:
  arranging a dark background behind the object target location;
  arranging at least one auxiliary light reflective area adjacent to the dark background;
  illuminating the at least one auxiliary light reflective area so that light reflected from the at least one auxiliary light reflective area passively illuminates an edge portion of the object when the object is disposed at the object target location, wherein the at least one auxiliary light reflective area is remotely disposed from the lens and beyond the field of view of the imaging device; and
  acquiring an image of the illuminated edge portion of the object, when the object is disposed at the object target location, using the imaging device, the illuminated edge portion of the object being differentiable from the dark background.

10. The method as recited in claim 9, further comprising the step of employing statistical analysis to detect the object within the image.

11. The method as recited in claim 9, wherein arranging the at least one auxiliary light reflective area includes disposing the auxiliary light reflective area adjacent to the dark background and beyond the imaging device field of view.

12. The method as recited in claim 9, wherein arranging the at least one auxiliary light reflective area includes disposing auxiliary light reflective areas at opposing ends of the dark background.

13. The method as recited in claim 9, wherein arranging the at least one auxiliary light reflective area includes angling the at least one auxiliary light reflective area towards the object target location and the imaging device.

14. The method as recited in claim 9, wherein the imaging device field of view has a focal axis, and wherein illuminating the at least one auxiliary light reflective area includes disposing at least one illumination device adjacent to and coaxial with the imaging device field of view focal axis.

15. The method as recited in claim 9, wherein the imaging device field of view has a focal axis, and wherein illuminating the at least one auxiliary light reflective area includes disposing at least one illumination device remotely from the imaging device and out of the imaging device field of view.

16. The method as recited in claim 9, wherein the object is a vessel.

17. The method as recited in claim 16, wherein the object further comprises a vessel cap disposed in conjunction with the vessel.

\* \* \* \* \*